United States Patent [19]
Sabet-Peyman et al.

[11] Patent Number: 5,717,401
[45] Date of Patent: Feb. 10, 1998

[54] ACTIVE RECOGNITION SYSTEM WITH OPTICAL SIGNAL PROCESSING

[75] Inventors: Farhang Sabet-Peyman, San Jose; Robert L. Cohoon, Moss Beach, both of Calif.

[73] Assignee: Litton Systems, Inc., San Jose, Calif.

[21] Appl. No.: 522,513

[22] Filed: Sep. 1, 1995

[51] Int. Cl.[6] .................. G01R 23/17; G01S 13/08; G01S 13/00; G02F 1/33
[52] U.S. Cl. ................. 342/192; 324/76.37; 342/132; 359/305; 367/64
[58] Field of Search ................... 342/132, 192; 324/76.19, 76.37; 359/305; 367/64; 382/103, 106; 364/822, 485

[56] References Cited

U.S. PATENT DOCUMENTS

| | | |
|---|---|---|
| 4,644,267 | 2/1987 | Tsui et al. |
| 4,894,795 | 1/1990 | Whitehouse et al. ............ 364/807 |
| 4,922,256 | 5/1990 | Brandstetter ..................... 342/132 |
| 5,384,573 | 1/1995 | Turpin ............................ 342/179 |

OTHER PUBLICATIONS

Athale, Ravindra A., et al., "Acousto–Optic Processors for Real–Time Generation of Time Frequency Representations," *Optical Society of America* vol. 8, No. 3, Mar. 1983, pp. 166–168.

Barry, Daniel T., "Fast Calculation of the Choi–Williams Time–Frequency Distribution," *IEEE Transactions on Signal Processing*, vol. 40, No. 2, Feb. 1992, pp. 450–455.

(List continued on next page.)

*Primary Examiner*—Stephen C. Buczinski
*Attorney, Agent, or Firm*—Robert F. Rotella; Harold E. Gillmann

[57] ABSTRACT

An active recognition system comprises a transceiver, tracking electronics, an optical processor, and a data handler. The transceiver transmits chirped pulses and receives a series of reflected [replicas of the chirped pulse] replica pulses from [features of] an object [of interest]. The tracking electronics controls the transceiver to determine object range for gating the optical processor. The optical processor includes a "signal" Bragg cell driven by the reflection signal so that [a] throughgoing light [beam] is angularly redistributed as a function of the local spatial frequency of the acoustic waveform within the modulation aperture of the signal Bragg cell. At a first focal plane, the light defines a one-dimensional light distribution that includes moving spots that correspond to respective reflection replicas. A chirp-compensating collimating lens [with a focal length of opposite sign from and equal to the effective focal length of the chirp signal] collimates the light diverging from the moving spots for subsequent focusing by a "transform" lens at a final focal plane. A "sweep" Bragg cell [, which is driven by a linear sweep,] sweeps the beam orthogonal to the direction of spot movement to provide a two-dimensional distribution at the final focal plane in which each reflection replica is represented as a diagonal trace. A charge-coupled-device at the focal plane captures the distribution for input to the data handler which [attempts to match] "recognizes" the object by matching the acquired two-dimensional light distribution with the corresponding distributions for known objects. [A match provides a probable recognition.] The two-dimensional distribution provides for more sophisticated matching across different object orientations in real time. Since the two-dimensional distribution is acquired in real time, the present invention provides improved object recognition where recognition speed is critical.

5 Claims, 2 Drawing Sheets

OTHER PUBLICATIONS

Bartelt, H.O. et al., "The Wigner Distribution Function and its Optical Production," *Optics Communications*, vol. 32, No. 1, Jan. 1980, pp. 32–38.

Bastiaans, M.J., "The Wigner Distribution Function and Hamilton's Characteristics of a Geometric-Optical System," *Optics Communications*, vol. 30, No. 3, Sep. 1979, pp. 321–326.

Bastiaans, M.J., "The Wigner Distribution Function Applied to Optical Signals and Systems," *Optics Communications*, vol. 25, No. 1, Apr. 1978.

Bastiaans, M.J., "Transport Equations for the Wigner Distribution Function," *Optica Acta*, vol. 26, No. 10, 1979, pp. 1265–1272.

Bastiaans, M.J., "Transport Equations for the Wigner Distribution Function in an Inhomogeneous and Dispersive Medium," *Optica Acta*, vol. 26, No. 11, 1979, pp. 1333–1344.

Bastiaans, M.J., "Wigner Distribution Function and its Application to First-Order Optics," *J. Opt. Soc. of America*, vol. 69, No. 12, Dec. 1979.

Bukharin, N. A. et al., "Acoustoelectronic System for Generating a Modified Wigner Distribution," *Avtometriya*. No. 6, 1987, pp. 51–54.

Claasen, T.A.C.M. and Mecklenbrauker, W.F.G., "The Wigner Distribution —A Tool for Time–Frequency Signal Analysis (Part I)," *Phillips Journal of Research*, vol. 35, No. 3, 1980, pp. 217–250.

Claasen, T.A.C.M. and Mecklenbrauker, W.F.G., "The Wigner Distribution —A Tool for Time–Frequency Signal Analysis (Part II)," *Phillips Journal of Research*, vol. 35, No. 4/5, 1980, pp. 276–300.

Claasen, T.A.C.M. and Mecklenbrauker, W.F.G., "The Wigner Distribution —A Tool for Time–Frequency Signal Analysis (Part III)," *Phillips Journal of Research*, vol. 35, No. 6, 1980, pp. 372–389.

Easton, Jr., Roger L., et al., "Application of the Radon Transform to Optical Production of the Wigner Distribution of the Wigner Distribution Function," *Optical Engineering* vol. 23, No. 6, Nov./Dec. 1984, pp. 738–744.

Eichmann, G. and Dong, B. Z., "Two-dimensional Optical Filtering of 1-D Signals," *Applied Optics*, vol. 21, No. 17, Sep. 1, 1982, pp. 3152–3156.

Fineberb, Adam B., and Mammone, Richard J., "A Fast Method of Tracking Multiple Non–Statutory Tones," *IEEE Military Communications Conference–MILCOM 9*, Part 1 of 3, Monterey, CA, USA Sep. 30–Oct. 3 1990.

Kenny, O. and Boashash, B., "An Optical Signal Processor for Time–Frequency Signal Analysis Using the Wigner–Ville Distribution," *Journal of Electrical and Electronics Engineering, Australia–Ie Aust. & IREE Aust.*, vol. 8, No. 3, Sep. 1988, pp. 152–158.

Lohmann, A. W., and Paris, D.P., "Space-Variant Image Formation," *J. Opt. Soc. of America*, vol. 55, No. 8, Aug. 1965.

Porter, William A., "Computational Aspects of Quadractic Signal Processing," *IEEE Transactions on Acoustics, Speech, and Signal Processing*, vol. 38, No. 1, Jan. 1990, pp. 137–144.

Schmidt, Ralph O., "Multiple Emitter Location and Signal Parameter Estimation," *IEEE Transactions on Antennas and Propagation*, vol. AP-34, No. 3, Mar. 1986, pp. 276–280.

Subotic, Nikola, and Saleh, Bahaa E.A., "Generation of the Wigner Distribution Function of Two-Dimensional Signals by a Parallel Optical Processor," *Optics Letters*, vol. 9, No. 10, Oct. 1984, pp. 471–473.

Subotic, Nikola, and Saleh, Bahaa E.A., "Optical Time–Variant Processing of Signals in the Mixed Time–Frequency Domain," *Optics Communications*, vol. 52, No. 4, Dec. 15, 1984, pp. 259–264.

Sun, Mingui, et al., "Efficient Computation of the Discrete Psuedo–Wigner Distribution," *IEEE Transactions on Acoustics, Speech, and Signal Processing*, vol. 37, No. 11, Nov. 1989, pp. 1735–1742.

Szu, Harold H., and Caulfield, H. John, "The Mutual Time–Frequency Content of Two Signals," *Proceedings of the IEEE*, vol. 72, No. 7, Jul. 1984, pp. 902–908.

Walkup, John F., "Space–Variant Coherent Optical Processing," *Optical Engineering*, vol. 19, No. 3, May/Jun. 1980.

ACTIVE RECOGNITION SYSTEM WITH OPTICAL SIGNAL PROCESSING

BACKGROUND OF THE INVENTION

The present invention relates to active recognition systems and, more particularly, to such systems with optical signal processors. A major objective of the present invention is to provide detailed recognition data in real time.

Active recognition systems transmit a waveform and then analyze its reflections from an object to characterize the object. Applications utilizing active recognition include robotics, ultrasound, radar, and sonar. The time between transmission and reception can indicate the distance of the object. The time between early and late reflections can provide information about object size. The reflection signal can be further analyzed to provide information about prominent features of the object.

Active recognition systems must address the fact that return signal power falls off as the fourth power of the object distance. Useful increases in range must be achieved by large increases in signal energy which for limited pulse durations requires corresponding increases in transmit pulse power. Since transmitters are constrained by respective maximum peak powers, the most convenient method of increasing signal energy is to increase pulse duration. However, a longer constant pulse can limit distance resolution. A solution has been to use a chirped pulse for which the frequency varies monotonically as a known, typically linear, function of time.

Isolating object characteristics involves compensation for the frequency variations in the transmitted pulse; e.g., "dechirping" a chirped pulse. While dechirping can be performed digitally, it can be achieved faster in the analog domain. For example, the reflected chirps can be passed through a frequency-dependent delay device, such as a surface acoustic wave (SAW) device, for which the delays imposed vary with frequency so that the delays are equal in magnitude and opposite in sign to those effectively imposed by the pulse generator. The result is a compression of each return chirp into a temporally narrow pulse. The result is a series of one or more short pulses reflected from respective structure features of the object. Thus, this process yields the object form without the chirp artifacts.

There are significant limitations to such time-domain signal analysis. A first limitation is that it is very difficult to determine object composition. A second limitation is that the signal waveform is very sensitive to object orientation. For example, the front and side "views" of an object generally have little in common. An automated recognition system would require a library storing many views for each library object to ensure a pattern match with an acquired recognition signal.

A Fourier transform can be applied to the voltage-versus-time profile to determine the spectral content of the reflections. The Fourier transform can be implemented optically using surface acoustic wave devices to obtain the spectral information in real time. Where the transmitted waveform is broadband, a spectral analysis differentiates highly reflected frequencies from those that are absorbed by the object. Thus, the spectral analysis can provide information about the material composition of the object. The frequency spectrum is far less sensitive to object orientation than is the amplitude waveform. Accordingly, the frequency spectrum is a useful alternative or addition to the amplitude waveform in providing for object recognition.

The amplitude-versus-time and spectral (intensity-versus-frequency) distributions can be acquired in real time. The time-domain analysis can be used for object distance, size, and location of prominent features. The frequency-domain analysis can provide information as to object composition. Since both the time-domain and frequency-domain information is useful for object recognition, one is challenged to coordinate them in an efficient recognition system. Even when used together, the intensity-versus-frequency and the amplitude-versus-time information can be inadequate for efficient matching.

What is needed is an improved real-time active recognition system. This system should provide sufficient information to provide improved discrimination between object types, while allowing objects of the same type to be matched despite differences in orientation. The system should provide for recognition without undue processing delays.

SUMMARY OF THE INVENTION

The present invention provides an active recognition system comprising a transceiver, a light source, an optical processor, and photodetector means for acquiring and storing a two-dimensional light distribution. The transceiver transmits a chirp and converts a resulting series of reflection chirps to an electrical signal. The optical processor uses the electric signal to modulate light from the light source so as to define, at a focal surface, a one-dimensional light distribution with spots of local intensity corresponding to respective reflection chirps. This one-dimensional distribution is swept across the focal surface to define, over the duration of the sweep, a two-dimensional distribution in which the spots trace curvilinear segments. This two-dimensional distribution can be stored for comparison with the corresponding two-dimensional distributions associated with library objects to provide object recognition.

The transmitted pulse is preferably a chirp that increases or decreases in frequency linearly with time. Alternatively, other chirps that increase or decrease in frequency monotonically but nonlinearly can be used. Typically, the transmitted pulse is generated electrically and then converted to radiant energy.

The resulting return signal can be a series of one or more low-energy replicas of the transmitted chirp where the replicas are spaced in time, but generally overlap since the duration of the transmit pulse typically exceeds the round-trip time-of-flight differences between object features. Thus, the reflections of a chirped transmission pulse by an object with distinct structural features results in a returning signal consisting of a superposition of chirps with a temporal spacing corresponding to the geometrical spacing of the structural features. The transceiver converts the radiant return signal to an electrical signal.

The return signal is used to drive a light modulator to affect throughgoing light, e.g., a laser beam. The laser beam can be directed through the modulation aperture of a "signal" Bragg cell driven by the return signal. Suitable optics shape the beam so that its cross section matches that of the modulation aperture. The signal Bragg cell converts the signal into an acoustic waveform that traverses the acousto-optic medium in the modulation aperture. The instantaneous acoustic waveform modulates the refractive index of the acousto-optic medium which in turn diffracts a portion of the throughgoing optical beam so that it is distributed angularly as a function of the spectral content of the acoustic waveform.

The characteristics of the modulator, the optical beam, and the frequency variation of the transmitted pulse can be matched so that either: as to define a real or virtual focal plane. 1) all the light associated with a chirp replica converges to a spot along a one-dimensional stripe in a focal surface (e.g., plane) downstream of the signal Bragg cell; or 2) all the light associated with a given chirp replicas diverges as through from a spot on a one-dimensional strip on a virtual focal surface upstream of the signal Bragg cell. The conditions for efficiently focusing the energy associated with a return replica at a spot are met using a linear chirp, or better, a slightly nonlinear chirp tailored to eliminate the spherical aberration inherent in the lensing effect of a linear chirp.

In either the real focal surface or virtual focal surface, the spots move along the stripe. The effect of a linear acoustic chirp in the Bragg cell on the diffraction portion of the optical beam is similar to that of a simple lens at the position of the Bragg cell aperture. As the chirp moves across the aperture as a function of time, the center of the equivalent lens moves with it. In the case of the real focal surface, light can be swept across the focal surface to generate the desired two-dimensional distribution. However, it is more practicable to perform the sweep across a second focal surface downstream of the first focal surface In the case of the real focal surface, light downstream of the real focal surface diverges from the real spot. In either the real focal surface case or the virtual focal surface case, the diverging light can be collimated to preserve the information about the replicas embodied by the diverging fan of light. The collimating optics have an effective focal length equal and opposite that of the chirp; thus, the collimating optics can be referred to as "dechirping" optics. The preferred dechirping optic is a passive lens. An active optical element, such as a Bragg cell, can be used instead of a passive collimating lens. The active element can be particularly useful for processing nonlinear transmit pulses.

The signal beams exiting the collimating optics have an angular spread and scanning direction along what can be called the signal plane which contains the signal propagation axis of the signal Bragg cell. In order to extract the signal pattern information they are independently scanned or swept as a group in a direction not parallel to and preferably orthogonal to the signal plane.

The sweep can be accomplished using a "sweep" Bragg cell with a second modulation aperture oriented orthogonally to the light beam and the first modulation aperture. Suitable optics shape the beam so that it conforms to the modulation aperture of a "sweep" Bragg cell. The sweep Bragg cell can be driven by a relatively long linear chirp so that it progressively deflects the beam transverse to the one-dimensional light distribution to define a second dimension for the resulting light distribution. The effect of the modulation imposed by the sweep Bragg cell is to sweep the optical output from the collimating lens in a direction orthogonal to the signal plane to provide the desired two-dimensional light distribution representing the object. Like the transmitted chirp, the sweep driving the sweep Bragg cell has an effective focal length. Accordingly, a lens of equal and opposite focal length can "desweep", i.e., collimate, the output of the sweep Bragg cell.

The beam can then be focused at a CCD, which captures the resulting two-dimensional light distribution. The instantaneous output of the focusing lens is a Fourier transform of the dechirped output of the chirp collimating lens. It is this Fourier transform that is swept to yield the two-dimensional distribution of light that is captured and used for matching.

The swept replica spots trace curvilinear segments on the focal plane at the detector. These segments are generally parallel to each other and oblique (relative to the directions of the moving spots and the orthogonal sweep) on the focal plane. In the preferred case of a linearly chirped transmit pulse, the segments are generally straight. Each of the lines (diagonals) represents a respective replica in the return signal. The spacing between traces corresponds to differences in round-trip times-of-flight to object features generating the reflections. Thus, the traces provide the information normally obtainable using an amplitude analysis.

The traces are not uniform along their lengths. Variations in intensity, sharpness, purity (absence of sidebands), and continuity are typical. While some of these variations are artifacts of the system, others variations are due to object characteristics. These latter variations can be used to help match recognition objects with library objects. For example, variations in intensity not due to system artifacts can result from spectral characteristics of an object feature. The frequencies represented as a chirp enters the modulation aperture are different than those represented as it exits. Unusually low intensity at one end of a trace can indicate high absorbance of the corresponding frequencies.

Higher frequency resolution (enhanced spectral information) in this respect can be achieved using a chirp that produces an acoustic waveform much longer than the modulation aperture. Higher signal sensitivity and higher spatial resolution can be achieved using longer modulation apertures. Accordingly, there are tradeoffs in selecting a ratio of chirp duration and modulation length. However, no additional information is obtained when the modulation aperture is longer than the chirp duration. Where maximum sensitivity and spatial resolution are desired, tolerancing can dictate a modulation aperture that is longer than the chirp. In general the modulation aperture should not be more than twice the chirp duration.

Trace anomalies can be considered as signature elements in the two-dimensional distribution. Even without determining their causes, signature elements can be used to match recognition and library objects, much as fingerprints are used to identify people. Thus, the two-dimensional distributions provide a relative rich source of distinguishing elements for matching. These signature elements vary only gradually with object orientation, so relatively few library variations need to stored per object. This saves on library storage as well as comparison time. The two-dimensional distributions can be acquired in real time, so the entire recognition process can be as fast as the digital processing involved in the matching. These and other features and advantages of the invention are apparent from the description below with reference to the following drawings.

DESCRIPTION OF THE PREFERRED EMBODIMENTS

Figure 1:
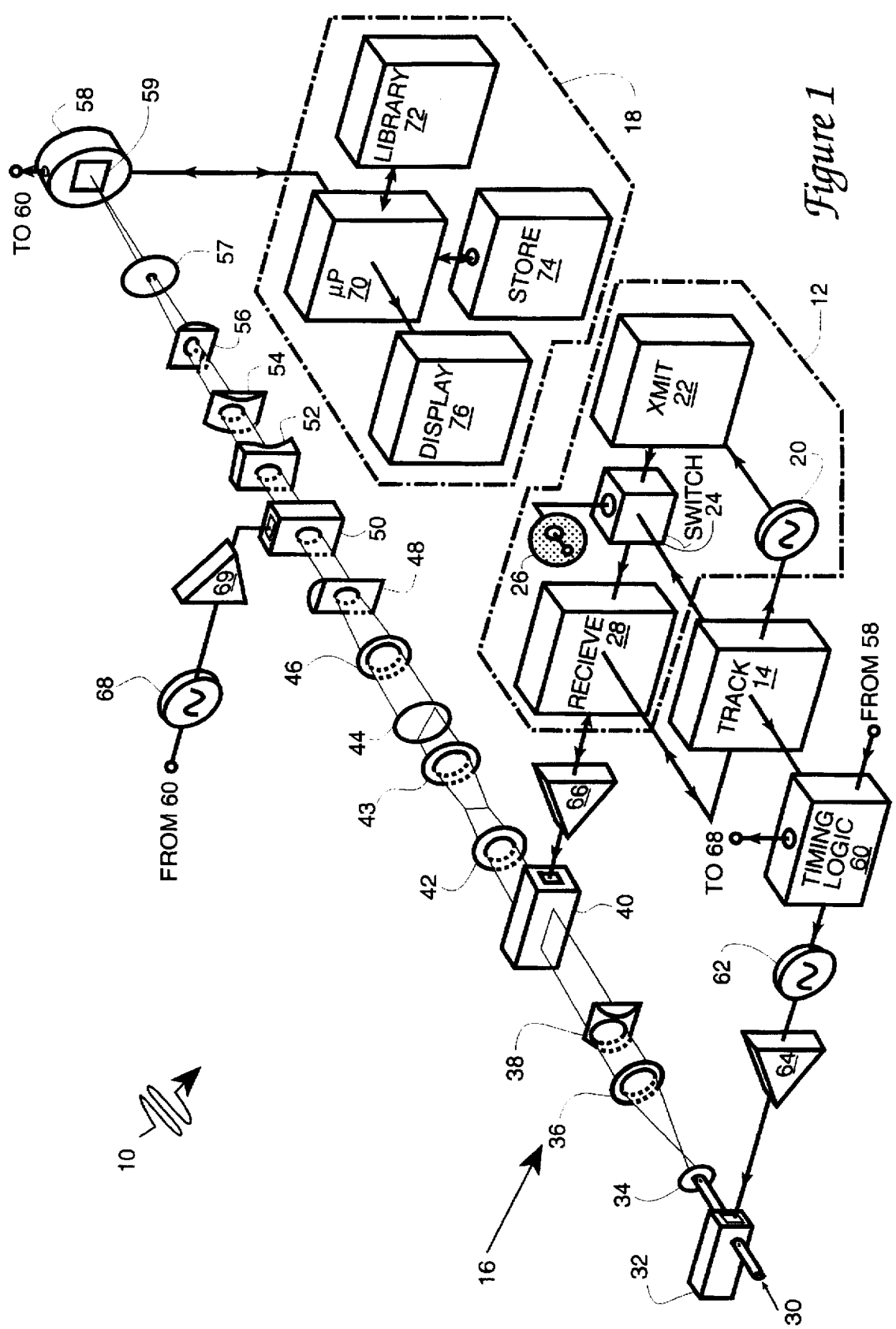
FIG. 1 is a schematic representation of an active recognition system incorporating a signal analyzer in accordance with the present invention.

In accordance with the present invention, an active recognition system 10 suitable for recognition of aircraft is illustrated in FIG. 1. Recognition system 10 includes a transceiver 12, tracking electronics 14, an optical processor 16, and a data handler 18. Transceiver 12 generates and transmits a chirped pulse and receives its reflections. Tracking electronics 14 determines object distance and direction using unchirped pulses. Optical processor 16 converts the reflections to a two-dimensional light distribution. Data handler 18 compares the acquired distribution with a library of distributions to complete object recognition.

Transceiver 12 includes a chirp generator 20, a transmitter 22, a switch 24, an antenna 26, and a receiver 28. Upon receiving a trigger signal from tracking electronics 14, chirp generator 20 generates a brief wide-band chirped pulse. Transmitter 22 amplifies the chirped pulse.

Switch 24 is controlled by tracking electronics 14 so that transmitter 22 is coupled to antenna 26 during pulse transmission for radiant transmission therefrom. Once the pulse is transmitted, tracking electronics 14 causes switch 24 to couple antenna 26 to receiver 28. Thus, radiant reflections arriving at antenna 26 are coupled to an electrical signal which is appropriately gated and conditioned by receiver 28.

Optical processor 16 comprises an optical train including a laser light source 30, a shutter Bragg cell 32, beam expander lenses 34 and 36, cylindrical focusing lens 38, a signal Bragg cell 40, imaging lenses 42 and 43, a pulse-chirp-compensating collimating lens 44, imaging and demagnifying lenses 46 and 48, a sweep Bragg cell 50, a sweep-compensating collimating lens 52, deflection angle multiplier lenses 54 and 56, a focusing lens 57, and a video camera 58 with an integral 512×512 pixel charge-coupled device (CCD) 59 at a focal plane defined by the listed optical elements.

In addition to the optical train elements, optical processor 16 includes electronics for driving Bragg cells 32, 40, and 50, and timing logic 60 for coordinating the operation of the Bragg cells and camera 58. The electronics for shutter Bragg cell 32 includes a sine-wave generator 62 and a radio frequency (rf) amplifier 64. The electronics for signal Bragg cell 40 includes an rf amplifier 66 that adjusts the received reflection signal to a dynamic range optimized for Bragg cell 40. The electronics for sweep Bragg cell 50 includes a sweep generator 68 and an rf amplifier 69.

Data handler 18 includes a data processor 70 that converts analog image values to digital data and provides for data manipulation. Library 72 includes a table of distributions for a predetermined set of objects and an algorithm that permits an acquired distribution to be compared with the library objects to achieve a match that permits recognition. The acquired image and data at various stages of manipulation can be stored in storage unit 74 and displayed by display 76.

Figure 2:
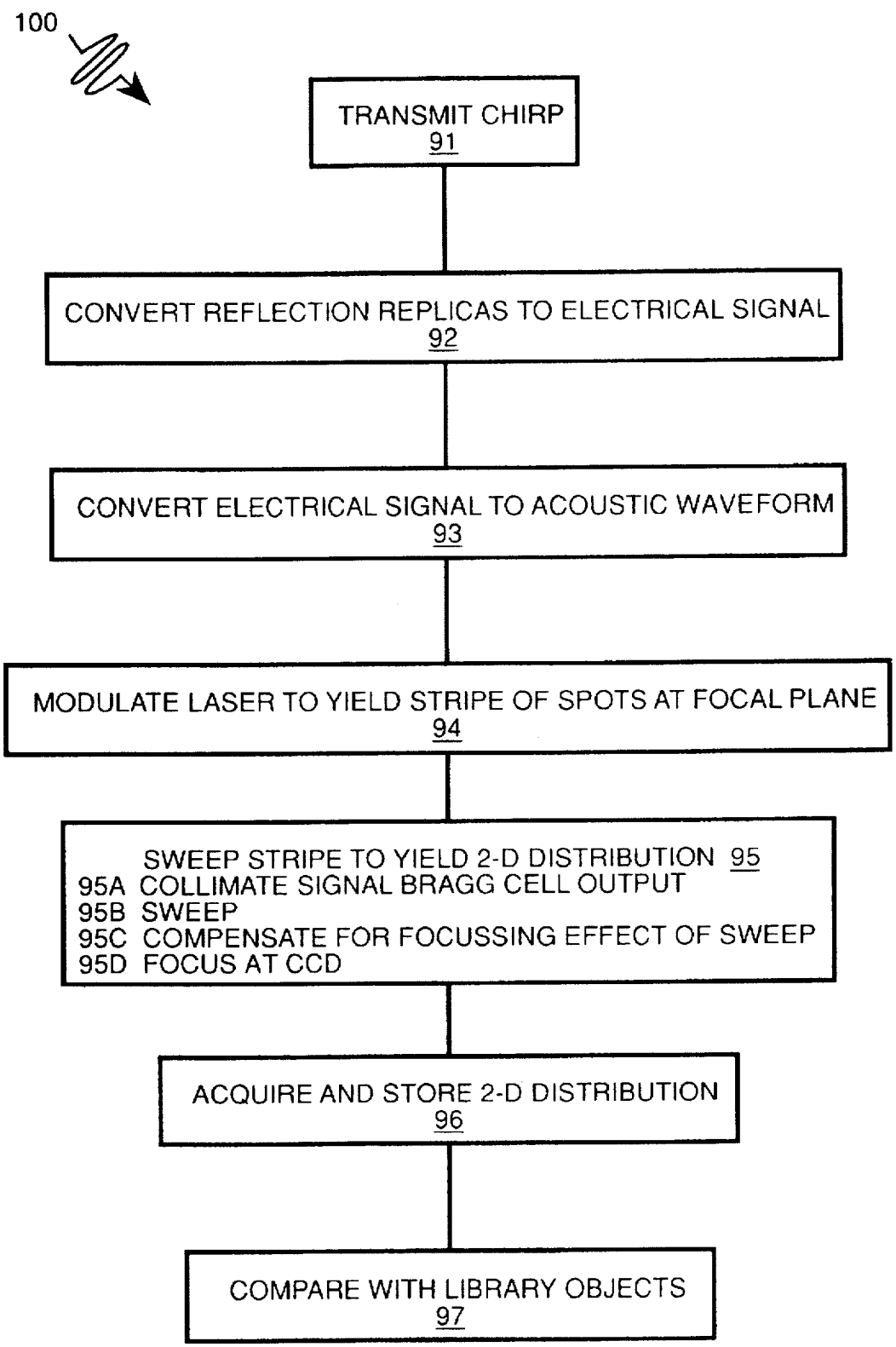
FIG. 2 is a flow chart of a method in accordance with the present invention employed using the recognition system of FIG. 1.

A method 100 of operating recognition system 10 is depicted in the flow chart of FIG. 2. A chirped pulse is transmitted at step 91. Reflections are received at step 92, converting radiant energy into an electrical signal. The electrical signal can be a superposition of electrical signals, each corresponding to a respective reflection replica of the transmitted pulse. The electrical signal is converted to an acoustic waveform that traverses the modulation aperture of the signal Bragg cell at step 93. The acoustic waveform is used to modulate a light beam transmitting through the modulation aperture so as to yield at a focal plane a one-dimensional light distribution in which spots of local intensity correspond to respective reflection replicas at step 94. The one-dimensional light distribution is swept to define over the duration of the sweep a two-dimensional light distribution at the focal plane in which the spots trace line segments at step 95.

Sweep step 95 includes substeps to make sweeping more practicable. In step 95A, the output of the signal Bragg cell is collimated by a dechirping lens. In step 95B, the collimated beam is swept by a sweep Bragg cell, after appropriate beam shaping. In step 95C, the focusing effect of the sweep signal is compensated by a "desweeping" lens. In step 95D, the beam is focused at the focal plane.

The two-dimensional light distribution is acquired and stored at step 96. The stored acquired two-dimensional light distribution is compared with a library of comparable distributions for possible object types at selected orientations to determine a recognition match at step 97.

In greater detail, tracking electronics 14 governs the locating and tracking of objects. It causes transmission of rf pulses interleaved between the main signal chirps, for use in tracking the object and determining its distance. Tracking electronics 14 causes antenna 26 to be connected to transmitter 22 during transmissions. Once the pulse is transmitted, tracking electronics 14 commands switch 24 to break the connection between antenna 26 and transmitter 22 and to connect antenna 26 to receiver 28 in anticipation of reflections. When tracking pulse reflections are received, they are conveyed from receiver 28 to tracking electronics 14. Tracking electronics 14 then analyzes and determines the round-trip time-of-flight for the pulse energy, thereby determining the object distance.

Chirp generator 20 generates a wide-band chirped pulse generated by a linear low-to-high 160 MHz frequency sweep about a 1.2 GHz center frequency. Transmit pulse duration is about 1.0 microsecond ($\mu$S). The pulse is amplified by transmitter 22 and radiated from antenna 26. The radiant reflection replicas from individual regions along the object length are received by antenna 26, which converts the replicas to electrical signal. This electrical waveform is typically a superposition of chirp waveform electrical signals corresponding to respective waveforms. The electrical signal is amplified by amplifier 66.

Timing logic 60 turns sine-wave generator 62 on during intervals in which reflections of interest are expected as determined by tracking electronics 14. When on, sine-wave generator 62 outputs a constant 100 MHz sine wave, which is amplified by rf amplifier 64 to match the dynamic range of shutter Bragg cell 32.

Acousto-optic shutter Bragg cell 32 comprises a piezoelectric crystal with electrodes at opposing ends. One electrode is connected to the output of rf amplifier 64 and the other electrode is grounded. The received electrical sine wave is converted to an acoustic sinewave that is coupled to the acousto-optic aperture. Shutter Bragg cell 32 has a modulation aperture that is elongated along the same crystal axis that separates the electrodes. The index of refraction within this modulation aperture varies according to the local acoustic amplitude.

Laser light from source 30 is directed through the modulation aperture of Bragg cell 32. When sine-wave generator 62 is activated, shutter Bragg cell 32 diffracts a large fraction of the throughgoing laser light along the optical axis of optical processor 16. Accordingly, laser light is directed along the optical axis of optical processor 16 during the interval in which reflections are expected. The light thus interacts with the reflection signals and impinges on CCD 59.

The angle of diffraction is large enough that when sine-wave generator 62 is not activated, the undiffracted laser light is effectively blocked at the focal plane of lens 34 to prevent the light from entering the rest of the optical train. Blocking light from the optical train when reflections are not expected minimizes the time-integrated background noise at CCD 59.

While the laser beam is directed into the optical train, it encounters beam expansion lenses 34 and 36. Lens 34 is a converging lens that causes the beam first to converge and then to diverge so that its cross section has been expanded by the time it reaches collimating lens 36. The expanded beam is then "flattened" by a cylindrical lens 38 so that the beam cross section conforms to the modulation aperture of signal Bragg cell 40.

Signal Bragg cell 40 works in principle like shutter Bragg cell 32. However, its electrical input is the reflection signal (amplified by rf amplifier 66). In general, the reflection signal does not have a single frequency but rather a complex frequency spectrum. The complex frequency spectrum can be analyzed as a superposition of sine-wave frequencies. Each frequency corresponds to a respective angle of deflection. The energy deflected along a given angle corresponds to the energy associated with the respective frequency. Thus, the effect of signal Bragg cell 40 on the throughgoing light beam is to redistribute its energy along different trajectory angles as a function of the frequency distribution. In other words, signal Bragg cell 40 transforms the interval of the reflection signal represented within the modulation aperture from a time-varying amplitude (of radiant and electrical energy) to an angularly varying amplitude (of light).

At any given instant, the acoustic waveform within the modulation aperture of signal Bragg cell 40 includes components from one or more reflection replicas. Each of these components is in the form of a spatial frequency sweep that corresponds to the transmit chirp. Correspondingly, the angle of deflection imposed by each component varies spatially so that all the light energy corresponding to a given reflection replica converges to or diverges from a spot at a focal plane at a distance from the Bragg cell determined by the effective focal length of the chirp. This spot moves along a stripe in the focal plane as the acoustic component due to that replica traverses the modulation aperture. If more than one replica is represented in the modulation aperture, plural moving spots are distributed along the stripe.

The intensity of a spot is determined not only by the strength of the reflection replica, but also by the percentage of the replica within the modulation aperture at any given instant. Thus, a spot can increase in intensity as it enters the modulation aperture and decrease at it exits the modulation aperture.

The greatest object resolution and the greatest signal intensity (and thus sensitivity) can be achieved when the a replica is entirely represented within the modulation aperture. Accordingly, signal Bragg cell 40 is designed with a modulation aperture length sufficient to contain a full replica for a short period of time. In the present case, the modulation aperture is sized to match a 1.5 µS chirp to provide ample tolerance for the 1.0 µS chirp used. Longer apertures involve greater expense without a corresponding gain in information. Accordingly, there is little to be gained using a modulation aperture more than twice the pulse duration.

Greater spectral information can be obtained using a chirp of greater duration than the modulation aperture. In this case, only a small frequency band of a chirp contributes to the respective light spot at any given instant. IF a object strongly absorbs energy in that frequency band, the spot will dim at the corresponding position and time. Frequency resolution increases with increasing chirp duration, decreasing chirp slope, and decreasing modulation aperture length. These same conditions decrease spatial resolution and sensitivity so the tradeoffs must be tailored to the application. Alternatively, two signal Bragg cells with different aperture lengths can be used either in parallel or in alternation to provide the advantages of each.

In any event, some frequency information is available as the replica waveform enters and exits the modulation aperture as well as in the diffraction pattern of the focal line with the chirp fully in the aperture. Accordingly, changes in spot intensity, focus, etc., can indicate aspects of the object being recognized.

Imaging lenses 42 and 43 image the signal Bragg cell modulation aperture on collimating lens 44. Without collimating lens 44, light that had converged to form the aforementioned spots would diverge past the focal plane. Collimating lens 44 in effect cancels the focusing action of the chirps in the aperture of the Bragg cell 40 and provides instead a fan of collimated light beams scanning in angle as a function of time with an angular spacing pattern corresponding to the temporal spacing of the signal chirps traversing the Bragg cell aperture. These beams are then relayed through the remainder of the optical system and ultimately focused by lens 57 to form an array of spots moving across CCD 59.

Chirp-compensating collimating lens 44 is a spherical lens positioned where the optical beam converges to a horizontal focal line (as shown in FIG. 1) which is aligned with time axis of the image of the aperture of Bragg cell 40 formed at the lens. Thus, it has no power in the vertical direction and could be replaced by a cylindrical lens with power in the horizontal plane (cylindrical axis oriented vertically). An optional mask placed at the position of lens 44 provides a sharp definition of the length of aperture of Bragg cell 40.

The focal length of collimating lens 44 is chosen to be equal in magnitude but opposite in sign to the equivalent focal length F of the acousto-optically generated signal chirp via the relationship $$F = \frac{v^2 \tau_c}{\lambda \Delta f_c}$$

where V is the acoustic velocity in the signal Bragg cell 40, $\lambda$ is the laser beam wave length, $\tau_c$ is the transmitted radar chirp time duration, and $\Delta f_c$ is the transmitted radar chirp bandwidth.

Lenses 46 and 48 produce at sweep Bragg cell 50 a demagnified image of the masked output from lens 44, defining the aperture length of Bragg cell 40, to fit within the narrow dimension of the modulation aperture of Bragg cell 50. The lenses also size and collimate the light beam in the direction along the acoustic axis of Bragg cell 50. Note that the design constraints on Bragg cell 50 are more severe than those for the signal Bragg cell 40, since its operating bandwidth and aperture size in both directions are much greater.

Sweeping is accomplished using the optical elements between chirp-compensating collimating lens 44 and transform lens 57. The active sweeping element is sweep Bragg cell 50. Bragg cell 50 acts as a high speed deflector of the optical beam carrying the signal information to generate a time base for the two-dimensional light distribution. The deflection is orthogonal to the frequency or signal deflection plane coordinate of the system.

Sweep Bragg cell 50 is driven by a linear frequency sweep from 100 MHz to 300 MHz over an 5 µS interval. This interval is sufficient to permit the modulation aperture of sweep Bragg cell 50 to be filled with the sweep prior to receipt of the first reflection and until the tail of the last reflection has exited the modulation aperture of signal Bragg cell 40 (allowing for a maximum round-trip time-of-flight distance between near and far object features of about 0.5 µS). The length of the modulation aperture of the Sweep Bragg cell and the sweep frequency chirp rate are chosen so the bandwidth of the portion of the chirp within the aperture is comparable to that of the signal chirp bandwidth in order to provide resolution at the CCD focal plane that is comparable to the maximum resolution produced by a signal chirp. Timing logic 60 controls this sweep so that it is synchronized with the expected reflection interval and with shutter Bragg cell 32.

The linear sweep is amplified to match the dynamic range of sweep Bragg cell 50 by rf amplifier 69. The modulation aperture of sweep Bragg cell 50 is orthogonal to both the light trajectory and to the modulation aperture of signal Bragg cell 40. The linear sweep imposes a gradual deflection of the throughgoing beam. The effect is to sweep the strip of moving spots orthogonal to its extent on CCD 59 to produce the desired two-dimensional distribution.

Cylindrical collimating lens 52 cancels the focusing effect of the chirp driving sweep Bragg cell 50, much as collimating lens 44 cancels the effects of the chirping of the original transmit pulse. The beam output from sweep Bragg cell 50 and collimating lens 52 is scanned transverse to the direction of spot movement. Imaging cylindrical lenses 54 and 56 are included to simultaneously magnify the deflection angle, so that the extent of the scan matches the height of CCD 59, and recollimate the reduced beam height.

The resulting optical output is focused by lens 57 onto CCD 59. At any instant in time, the light distribution on CCD 59 consists basically of an array of focal spots or artifacts representing the chirp reflection replicas from the object which are spread along (for the FIG. 1 configuration) a horizontal line. As time progresses and the signal chirps move across the aperture of Bragg cell 40, the spots move together in the horizontal direction while at the same time they are swept in the orthogonal (vertical) direction.

The result is that a given spot, the intensity and diffraction pattern of which may vary with time, traces a diagonal line across CCD 59. The duration of the sweep is sufficient to record the traces of all returns from the transmitted pulse within the designed object size limits, dependent upon accurate synchronization with the returns.

The entire sweep takes much less than one camera frame period so that the resulting entire two-dimensional light distribution is gathered in one frame for output to data handler 18. The camera converts the CCD image to digital format for transfer to data handler 18. Camera 58 outputs a camera ready signal to timing logic 60. If the camera is not ready, timing logic 60 leaves the laser and the shutter drive signal off.

As indicated above, data handler 18 matches the acquired two-dimensional light distribution with comparable library object distributions. The employed classification algorithm can manipulate library two-dimensional light distributions to take into account different object orientations.

The acquired two-dimensional light distribution is typically characterized by generally parallel diagonal line segments. The spacing of the segments indicates time of flight differences for different object features. The overall intensity of a line segment indicates the reflectivity of the respective object feature. Intensity typically varies along a line segment since not all the energy associated with a reflection replica is within the modulation aperture as it enters and exits the aperture. Intensity variations beyond those attributable to entering and exiting can indicate spectral characteristics of the respective object feature. Blurring and discontinuities of a line segment can be caused by doppler shifts, such as motion of an object feature relative to the rest of the object.

The spacing of line segments in the two-dimensional line distribution changes is a function of object orientation. However, the order and individual line characteristics tend to be preserved over moderate changes in orientation. Accordingly, by scaling library objects to correspond to the spread of segments in the acquired distribution, matching can be achieved. Relatively few distributions need to be stored per object in the library to represent different object orientations. This reduces the time required for recognition.

While the recognition process inevitably requires some time, it should be noted that the two-dimensional light distribution is in progress while the reflections are being received. The two-dimensional light distribution is completed and in analog storage within a few nanoseconds after the "tail-end" of the signal has been received. Thus, the signal optical signal analysis at most contributes negligibly to the time required for recognition.

While the preferred embodiment utilizes chirped pulses the frequencies of which increase linearly in time, other types of time-variable transmit pulses can be used. Likewise, nonlinear chirps can be used as transmit pulses, with an appropriately matched nonlinear collimating lens.

An active element, such as a Bragg cell, can be used for collimation instead of a passive optical lens. For example, for a chirped transmit pulse, the collimating Bragg cell is driven by a delayed but otherwise identical chirp signal.

In this case, the propagation direction of the chirp signal in the collimating Bragg cell is opposite to the propagation direction of the signal in the superimposed image of the signal cell aperture. Since the chirp collimating lens is moving, the interaction time with the signal is reduced significantly (roughly a factor of two) from that for a passive collimating lens. This feature would ease the design constraints on the sweeping Bragg cell.

The present invention provides for a variety of transmit pulse forms. The transmits pulses can be linear or nonlinear frequency chirps. More generally, nonmonotonic, noncontinuous, and frequency agile pulses can be used. The optical processor elements are modified accordingly to compensate for the different pulse characteristics.

Alternative embodiments of the present invention employ Bragg cells to implement the dechirping-collimating functions. The use of active optical elements is particularly useful in conjunction with frequency agile transmit pulses. Where a chirp-compensating Bragg cell is used with a nonlinear chirp, especially strict synchronization is required. This can be achieved by precisely predetermining object distance or by using the return signal to trigger the collimating drive signal.

The main purpose of the chirp-compensating lens (or Bragg cell) is to preserve information while maintaining the beam in an appropriate form for sweeping. Alternative embodiments dispose a CCD at the plane of convergence of the signal Bragg cell output (which is upstream of the collimating lens in the preferred embodiment). Alternate means are used for sweeping the fan output from the signal Bragg cell across the CCD. In this case, the collimating lens and the transform lens are not required to attain the desired two-dimensional light distribution. In these embodiments, the sweeping means can involve utilizing the shutter Bragg cell to also perform the sweeping operation with appropriate changes in the optics and the aperture height of the signal Bragg cell, redesigning the CCD array to read out adjacent columns of pixels in parallel at high speed, etc. These and other modifications to and variations upon the described embodiments are provided for by the present invention, the scope of which is limited only by the following claims.

What is claimed is:

1. A system comprising:

transceiver means for transmitting a chirped pulse and for converting a series of reflection replicas, including a first reflection replica, of said chirped pulse into an electrical signal having a time-varying amplitude, said receiver being radiantly coupled to said transmitter;

a light source for providing a beam of light;

an optical processor for modulating said light so that it defines a one-dimensional time-varying light distribution at a focal surface, said one-dimensional time-varying light distribution including spots of locally high intensity corresponding to said reflection replicas that are distributed along and move along said one-dimensional time-varying light distribution, said optical processor including transducer means for converting said electric signal into a time-varying acoustic waveform, said transducer means having a modulation aperture across which said acoustic waveform traverses, said transducer means being coupled to said receiver means for receiving said electrical signal therefrom, said transducer means being optically coupled to said light source so that said light beam transmits through said modulation aperture, and sweep means for sweeping said one-dimensional time-varying light distribution during a sweep duration so as to define over said sweep duration a two-dimensional light distribution in which said spots trace respective curvilinear line segments, said sweep means being optically coupled to said transducer means; and capture means disposed at said focal surface for storing said two-dimensional light distribution.

2. A system as recited in claim 1 wherein said transducer means modulates said light so that its angular distribution is a function of the spatial frequency distribution of said acoustic waveform.

3. A system as recited in claim 2 wherein said optical processor further comprises:

collimating means for converting said angular distribution into said one-dimensional time-varying light distribution, said collimating means being optically coupled to said transducer means for receiving said light beam therefrom, said collimating means being optically coupled to said sweep means for providing said light beam thereto; and focusing means for focusing said spots at said focal surface, said focusing means being optically coupled to said sweep means for receiving said light beam therefrom.

4. A method comprising:

transmitting a chirped pulse;

receiving a series of reflection replicas of said chirped pulse so as to generate an electrical signal;

converting said electrical signal to a time-varying acoustic waveform that traverses a modulation aperture;

directing a light beam through said modulation aperture;

optically processing said light beam as a function of said acoustic waveform so as to define a one-dimensional light distribution at a focal surface, said one-dimensional light distribution including spots that are distributed along and move along a first direction on a focal surface, each of said spots corresponding to a respective one of said reflection replicas;

sweeping over a sweep duration said light in a second direction that is different from said first direction so as to define over said sweep duration a two-dimensional light distribution in which said spots trace respective curvilinear line segments; and storing said two-dimensional light distribution.

5. A method as recited in claim 4 wherein said optically processing step involves:

modulating said light so that its angular distribution is a function of the spatial frequency distribution of said acoustic waveform;

collimating said light so as to define a time-varying one-dimensional light distribution; and focusing said light at said focal surface.

* * * * *